United States Patent
Tsirkin et al.

(10) Patent No.: US 8,719,631 B2
(45) Date of Patent: May 6, 2014

(54) VIRTUAL MACHINE (VM)-BASED DISK RESCUE

(75) Inventors: Michael Tsirkin, Yokneam Yillit (IL); Gleb Natapov, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 286 days.

(21) Appl. No.: 13/180,216

(22) Filed: Jul. 11, 2011

(65) Prior Publication Data

US 2013/0019240 A1 Jan. 17, 2013

(51) Int. Cl.
*G06F 11/00* (2006.01)
(52) U.S. Cl.
USPC .............................................. 714/23; 714/29
(58) Field of Classification Search
USPC .................. 714/23, 29, 30, 31, 32; 718/1, 100
See application file for complete search history.

(56) References Cited

U.S. PATENT DOCUMENTS

| 8,135,985 | B2 * | 3/2012 | Mishra et al. | 714/13 |
|---|---|---|---|---|
| 2008/0222234 | A1 * | 9/2008 | Marchand | 709/201 |
| 2010/0107158 | A1 * | 4/2010 | Chen et al. | 718/1 |
| 2010/0325471 | A1 * | 12/2010 | Mishra et al. | 714/3 |
| 2011/0219234 | A1 * | 9/2011 | Bogner | 713/175 |

OTHER PUBLICATIONS

Distler, Tobias, et al. "Efficient State Transfer for Hypervisor-Based Proactive Recovery," Copyright, 2008.
Virtual Machine Backup Guide, ESX Server 3.0.0 and VirtualCenter 2.0.1, VMwater, Inc., 2006.
How to Back Up VHD? http://serverfault.comiquestions/108695/how-to-back-up-vhd, Feb. 3, 2010.

* cited by examiner

*Primary Examiner* — Dieu-Minh Le
(74) *Attorney, Agent, or Firm* — Lowenstein Sandler LLP (57) ABSTRACT

A mechanism for virtual machine (VM)-based disk rescue is disclosed. A method of the invention includes starting a reboot process of a VM hosted on a host computing machine, controlling an invocation of a recovery media that is used by a recovery process on a disk of the VM and is located separate from the VM disk, and restarting the VM after the recovery process using the recovery media successfully completes.

20 Claims, 5 Drawing Sheets

Determine that error, corruption, or fault conditions may be occurring
310

Instruct a recovery management agent of the hypervisor managing the VM to perform recovery utilizing recovery media separate from the VM upon the next reboot of the VM
320

Discontinue VM boot while recovery media that is separate from the VM runs a recovery process on the VM disk
330

Restart VM processing after recovery completed successfully by the recovery media and hypervisor reboots VM
340

VIRTUAL MACHINE (VM)-BASED DISK RESCUE

TECHNICAL FIELD

The embodiments of the invention relate generally to virtualization systems and, more specifically, relate to virtual machine (VM)-based disk rescue.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Often times, a VM corrupts the disk image of the VM and it is not possible to recover from within the VM. A classic solution to VM disk corruption is a recovery that is performed by the host machine. For example, the host machine may utilize an emulated disk of the VM that is stored separate from the VM in the host machine to restore the VM. This backup file in the host machine can be used to restore the VM by the host machine whenever the VM becomes corrupt. However, this solution can be quite expensive space-wise for a host machine. Some current solutions overcome this space constraint by utilizing snapshotting, where a snapshot of the VM image is taken and then any subsequent changes made to the VM are incremented on top of the snapshot. In either case, the recovery operations are performed by the host machine and the VM is not running or accessing the recovery file. Furthermore, snapshotting can often be problematic due to the multitude of incremental changes being made, which can cause complications for the host machine and VM.

Another current solution for recovering from VM disk corruption does include the VM performing operations for the recovery. In this case, the VM itself runs back-up software that creates a copy of the VM disk and can restore the VM from that back-up copy. This backup source is part of the regular running VM at all times. A problem with this solution is that the VM can only recover to the specific point that the backup copy was made. In addition, there is a cost in terms of space for maintaining a backup copy of the VM at all times. Finally, the involvement of the VM can be problematic for recovery when the VM itself becomes corrupted, often preventing any recovery operations from being performed by the VM at all.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for virtual machine (VM)-based disk rescue. A method of embodiments of the invention includes starting a reboot process of a VM hosted on a host computing machine, controlling an invocation of a recovery media that is used by a recovery process on a disk of the VM and is located separate from the VM disk, and restarting the VM after the recovery process of the recovery media successfully completes.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "starting", "controlling", "restarting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for virtual machine (VM)-based disk rescue. In one embodiment, when a VM needs to recover from corruption or other faults, the hypervisor makes recovery media (such as a recovery tool) available to the VM in the VM boot menu. The recovery media allows the VM to boot from a different source than the one used for regular VM functionality. This source is also separate from the VM. Embodiments of the invention allow the VM itself to control recovery from a corrupted disk image without having to involve a host machine or hypervisor administrator.

Figure 1:
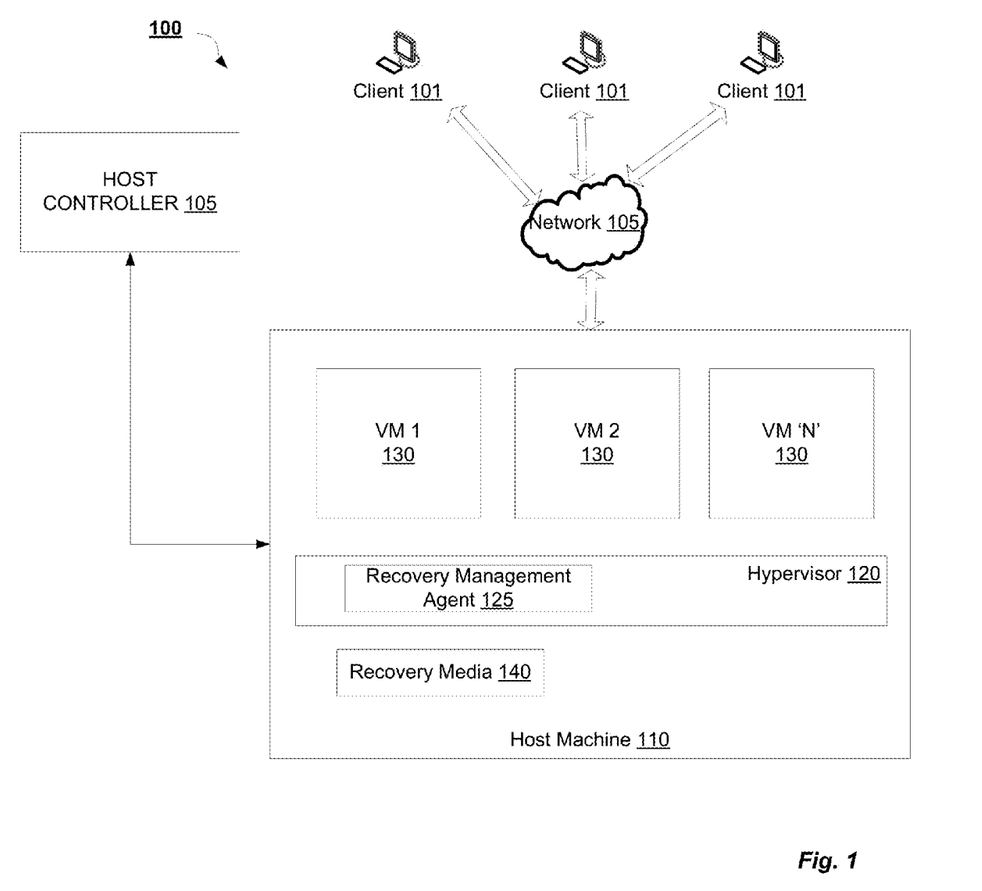
FIG. 1 is a block diagram of an exemplary network architecture in which embodiments of the present invention may operate.

FIG. 1 is a block diagram of an exemplary network architecture 100 in which embodiments of the present invention may operate. The network architecture 100 includes a host machine 110 coupled to one or more clients 101 over a network 105. The network 105 may be a private network (e.g., a local area network (LAN), a wide area network (WAN), intranet, etc.) or a public network (e.g., the Internet). In one embodiment, host machine 110 may also be known as a host computing device. Typically, host machine 110 includes at least a processor and a memory. In some cases, host machine 110 may be a server computing device. In some embodiments, although not illustrated, clients 101 may be hosted directly by host machine 110 as a local client on host machine 110. Furthermore, there may be multiple host machines connected to network 105 and serving clients 101.

The clients 101 may include computing devices that have a wide range of processing capabilities. Some of the clients 101 may be thin clients, which have limited processing and memory capacities. For example, a thin client may a laptop computer, cellular phone, personal digital assistant (PDA), a re-purposed desktop computer, etc. Some of the clients 101 may be thick (fat) clients, which have powerful CPUs and large memory. For example, a thick client may be a dual-core or multi-core computer, workstation, graphics workstation, etc. The client 101 may run client applications such as a Web browser and a graphic user interface (GUI). The client 101 may also run other client applications, which receive multimedia data streams or other data from one or more host computers 110, 120 and re-direct the received data to a local display or other user interface.

As shown, host machine 110 may run one or more VMs 130. Each VM 130 runs a guest operating system (OS) that may be different from one VM to another. The guest OS may include, but is not limited to, Linux™, Microsoft™ Windows™, Solaris™, Macintosh™ OS, and so on. Furthermore, host machine 110 may include a hypervisor 120 that emulates the underlying hardware platform of host machine 110 for the VMs 130 that it hosts. The hypervisor 120 may also be known as a virtual machine monitor (VMM) or a kernel-based hypervisor. In some embodiments, the hypervisor 120 is part of a host operating system.

In one embodiment, each VM 130 can be accessed by the one or more of the clients 101 over the network 105. In one scenario, each VM 130 provides a virtual desktop for the client 101 that is viewable by an end user of the client 101. From the end user's point of view, the virtual desktop functions as a physical desktop (e.g., a personal computer) and is indistinguishable from a physical desktop.

As illustrated, the host machine 110 may be coupled to a host controller 105 (via a network or directly). In some embodiments, the host controller 105 may reside on a designated computer system (e.g., a server computer, a desktop computer, etc.) or be part of the host machine 110 or another machine. VMs 130 may be managed by the host controller 105, which may add a VM, delete a VM, balance the load on the server cluster, provide directory service to the VMs 130, and perform other management functions.

In embodiments of the invention, host machine 110 includes recovery media 140. Recovery media 140 is configured to access a corrupted VM disk image, determine the problem causing the corruption, and recover the disk from the problem. In one embodiment, recovery media 140 is an International Organization for Standardization (ISO) image in the host machine 110 that is exposed to the VM 130 as read-only bootable media. However, other formats for recovery media 140 are also possible in embodiments of the invention. In some embodiments, the hypervisor 120 may use recovery media 140 to perform the recovery operations for VM 130. Recovery media 140 may further be utilized, via hypervisor 120, by multiple VMs 130 running on the host machine 110. In this way, disk space is saved because a separate recovery tool is not needed for each VM 130 on a host machine 110. In some embodiments, recovery media 140 may be originally found on a CD-ROM and then is emulated by the host machine 110.

Embodiments of the invention allow a VM 130 to initiate a recovery process of a corrupted VM 130 disk without involving a host machine administrator to access the hypervisor interface. More specifically, VM 130 may dictate that recovery media 140 is utilized upon the next reboot of VM 130 instead of booting from the regular VM disk. As a result, a VM 130 end user can recover a corrupted disk image of the VM 130 without involving the assistance of a host machine 110 administrator.

The recovery process of embodiments of the invention encompasses booting from different media and different content than the boot media used for regular VM 130 functions. The recovery process includes rebooting the VM 130 using recovery media 140, performing a regular disk recovery operation, and rebooting back into the recovered regular VM 130 disk. In this way, the recovery media 140 does not need to be a part of the VM 130 that is invoking its use, which is beneficial for VMs 130 with OS's that do not support execution of the specific recovery media 140. Furthermore, backup operations of the VM 130 are not required to be able to recover from corruption or disk error in embodiments of the invention.

Embodiments of the invention implement a recovery management agent 125 in the hypervisor 120 that allows the VM 130 to boot using the recovery media 140 whenever a command to recover from disk corruption is received. The command may be received from one of many different sources. For example, in one embodiment, the recovery management agent 125 itself can detect when the VM 130 has crashed and upon reboot invoke the recovery media 140 automatically. In some embodiments, the number of VM crashes may need to exceed a threshold amount (e.g., persistent VM 130 failure) before the recovery media is invoked automatically by the recovery management agent 125.

Additionally, host controller 105 may be able to pass a command to the recovery management agent 125 of the hypervisor 120 to invoke recovery media 140 upon the next reboot of VM 130. For example, a button to trigger disk recovery can be presented in a graphical user interface (GUI) presented to a host machine or hypervisor administrator. Clicking this button causes a disk recovery command to be sent to the hypervisor 120 through the host controller 105 or through the VM 130.

In another embodiment, the VM 130 can directly instruct the recovery management agent 125 of the hypervisor 120 to perform recovery of the VM 130 using recovery media 140 upon the next reboot of the VM 130. The end user of the VM 130 may utilize a program in the VM to communicate this instruction to the hypervisor 120. In one embodiment, a VM-hypervisor communication channel (not shown) is used to communicate this instruction. Upon the next reboot of the VM 130 the recovery program from recovery media 140 will be performed automatically.

In another embodiment, upon each boot of the VM 130, the VM BIOS presents to the end user of the VM 130 an option to boot using recovery media 140 or boot normally. The VM 130 end user can then select to use the recovery media 140 to recover from any disk corruption they have experienced.

Figure 2:
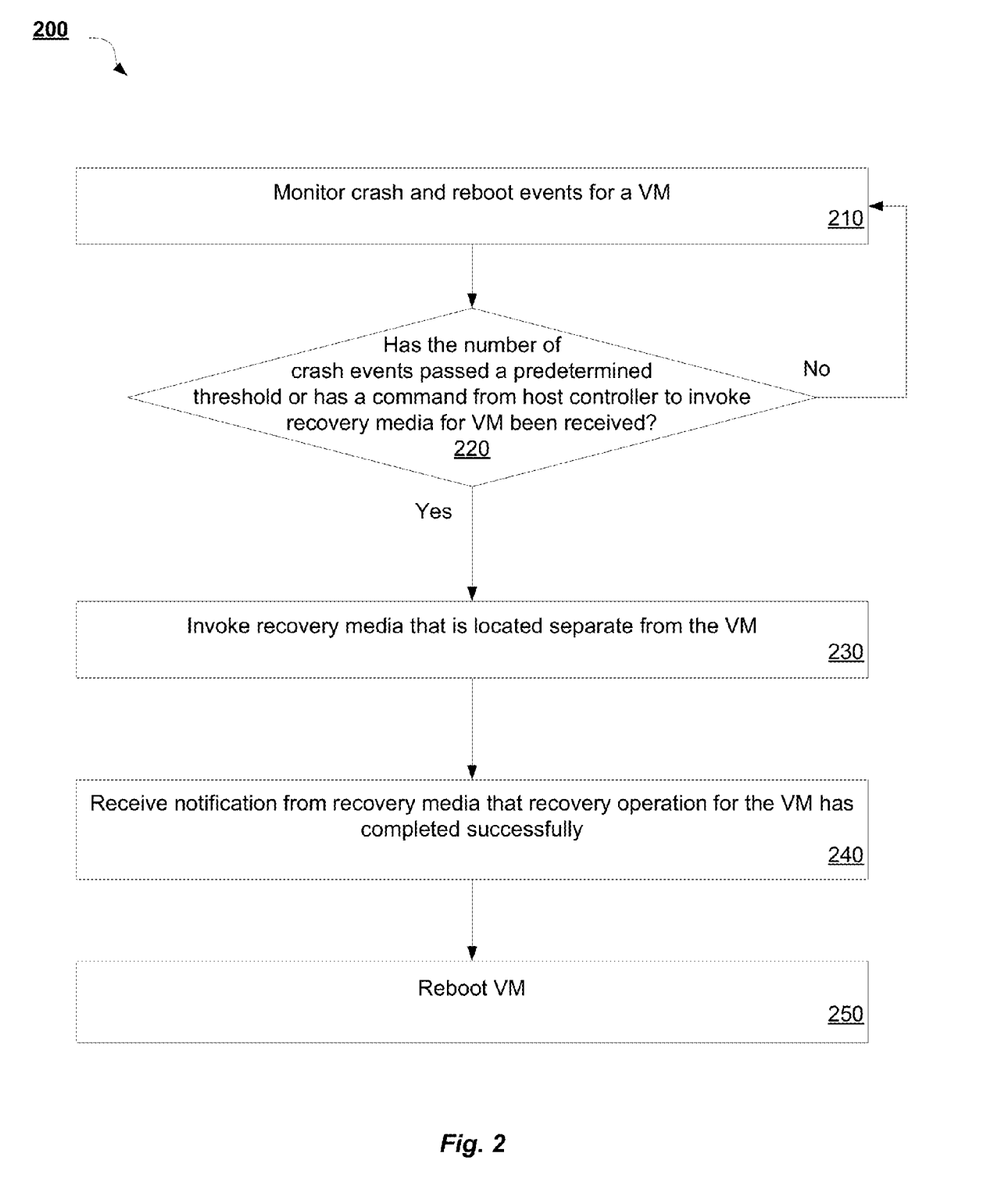
FIG. 2 is a flow diagram illustrating a method for virtual machine (VM)-based disk rescue according to an embodiment of the invention.

FIG. 2 is a flow diagram illustrating a method 200 for virtual machine (VM)-based disk rescue according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by host machine 110 of FIG. 1.

Method 200 begins at block 210 where a host machine, an in some cases a recovery management agent in the hypervisor of the host machine, monitors crash and reboot events that occur at any of the VMs managed by the host machine. Then, at decision block 220, it is determined whether the number of crash events at a particular VM has passed a predetermined threshold amount. In one embodiment, this predetermined threshold amount is set by a system administrator of the host machine or by a user of the VM. In addition, at decision block 220, it is also determined whether a command to invoke recovery media for the VM has been received from a host controller. If neither of the inquiries at decision block 220 is satisfied, then method 200 returns to block 210 to continue monitoring crash and reboot events at the VMs.

However, if either the number of crashes has exceeded the threshold or a command to invoke recovery media for the VM has been received at decision block 220, then method 200 continues to block 230. At block 230, recovery media that is located separately from the VM is started. Recovery media is configured to access a corrupted VM disk image, determine the problem causing the corruption, and recover the disk from the problem. In one embodiment, recovery media is an image in the host machine that is exposed to the VM as read-only bootable media. The hypervisor executes the recovery media, as instructed by the VM in order to perform the recovery operations for VM. At block 240, a notification is received from the recovery media via the hypervisor that a recovery operation has completed successfully. In another embodiment, if the recovery operation did not complete successfully, then a different recovery routine may be required that is beyond the scope of present embodiments of the invention. At block 250, the VM is rebooted and runs normally again.

Figure 3:
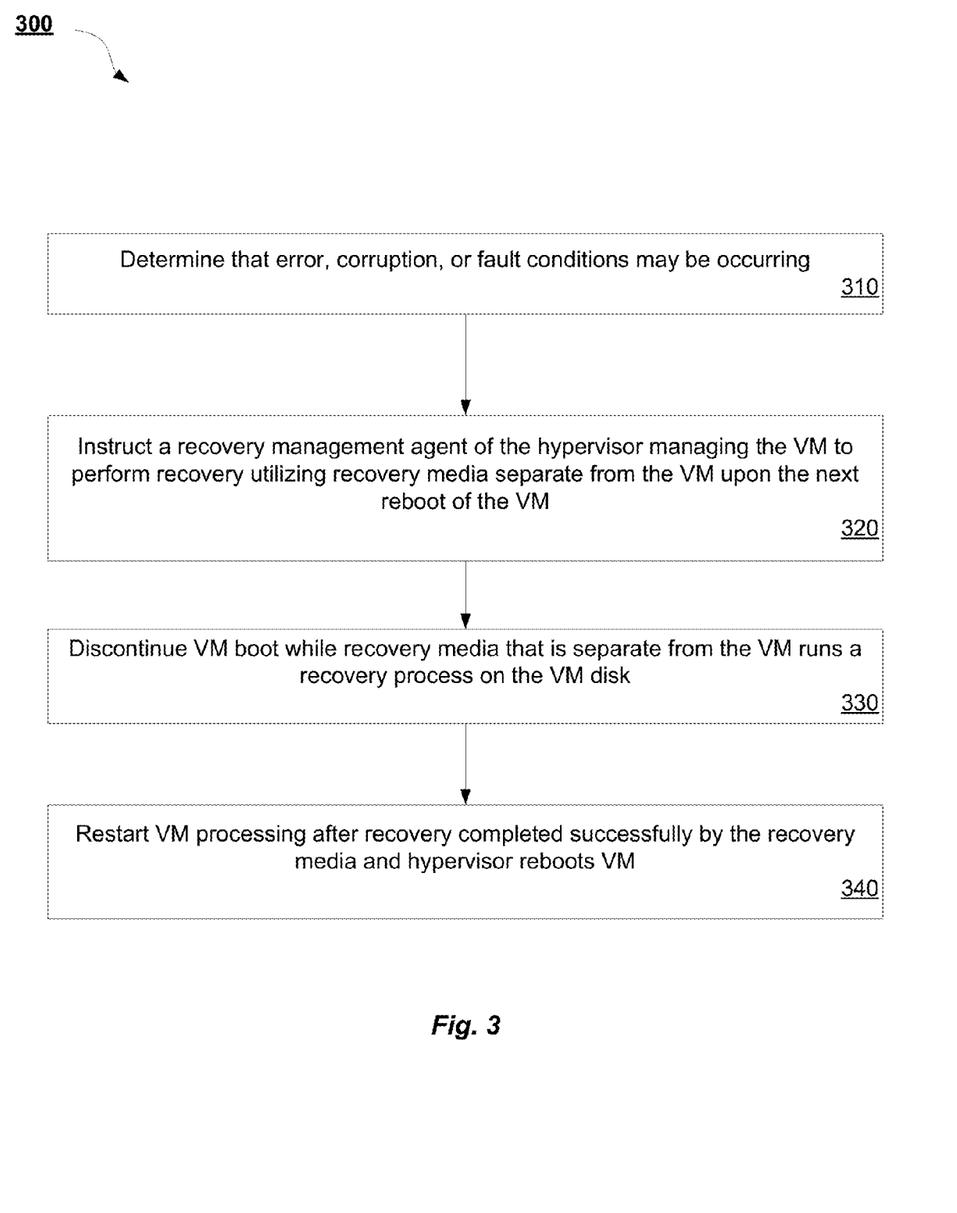
FIG. 3 is a flow diagram illustrating a method for virtual machine (VM)-based disk rescue according to a further embodiment of the invention.

FIG. 3 is a flow diagram illustrating a method 300 for virtual machine (VM)-based disk rescue according to a further embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by virtual machine 130 of host machine 110 of FIG. 1.

Method 300 begins at block 310 where a virtual machine determines that an error, corruption, or fault condition may be occurring in the VM. In one embodiment, the VM may detect performance issues or other processing problems that indicate these conditions. In other embodiments, an actual error message may have occurred that indicates the condition. At block 320, the VM instructs a recovery management agent of a hypervisor that is managing the VM to perform a recovery process upon the next reboot of the VM. The recovery process utilizes a recovery media that is separate from the VM.

Recovery media is configured to access a corrupted VM disk image, determine the problem causing the corruption, and recover the disk from the problem. In one embodiment, recovery media is an image in the host machine that is exposed to the VM as read-only bootable media. The hypervisor executes the recovery media, as instructed by the VM in order to perform the recovery operations for VM. Once the recovery media, as executed by the hypervisor, has finished its recovery process successfully and the hypervisor reboots the VM, the VM restarts its normal processing at block 330.

Figure 4:
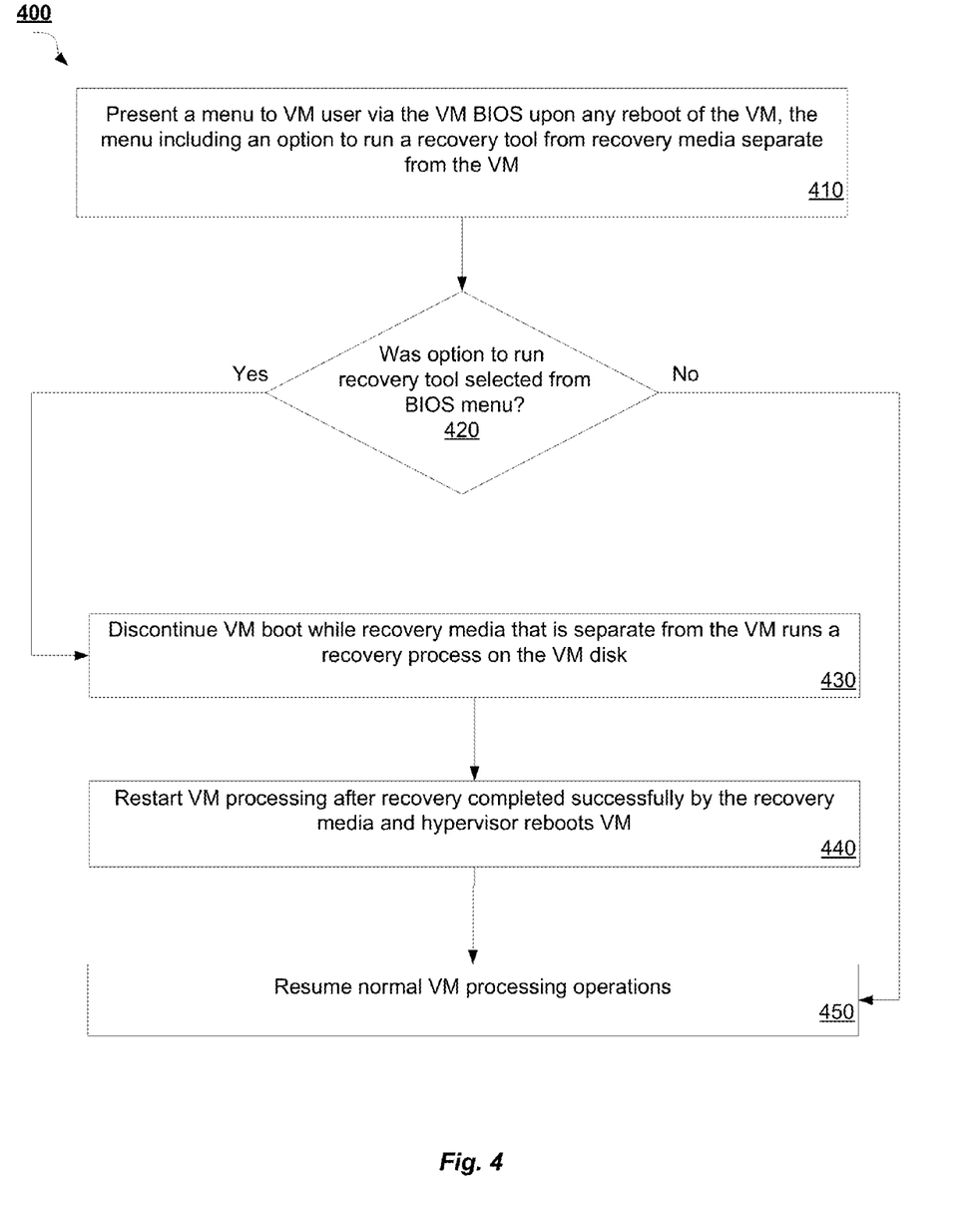
FIG. 4 is a flow diagram illustrating a method for virtual machine (VM)-based disk rescue according to another embodiment of the invention.

FIG. 4 is a flow diagram illustrating a method 400 for virtual machine (VM)-based disk rescue according to another embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by VM 130 of host machine 110 of FIG. 1.

Method 400 begins at block 410 where a menu is presented to an end user of a VM upon any reboot of the VM. This boot menu includes an option to run a recovery tool using recovery media that is separate from the VM. Recovery media is configured to access a corrupted VM disk image, determine the problem causing the corruption, and recover the disk from the problem. In one embodiment, recovery media is an image in the host machine that is exposed to the VM as read-only bootable media. The hypervisor executes the recovery media, as instructed by the VM in order to perform the recovery operations for VM. At decision block 420 it is determined whether the option to run the recovery tool was selected from the BIOS menu. If not, method 400 proceeds to block 450 where normal VM processing operations are resumed.

On the other hand, if the user selects the option to run the recovery tool, the method 400 continues to block 430 where the VM boot is discontinued while the recovery media that is separate from the VM runs a recovery process for the VM. At block 440, the VM is restarted after the recovery process has completed successfully and the hypervisor reboots from the VM. Lastly, the VM resumes normal VM processing operations at block 450.

Figure 5:
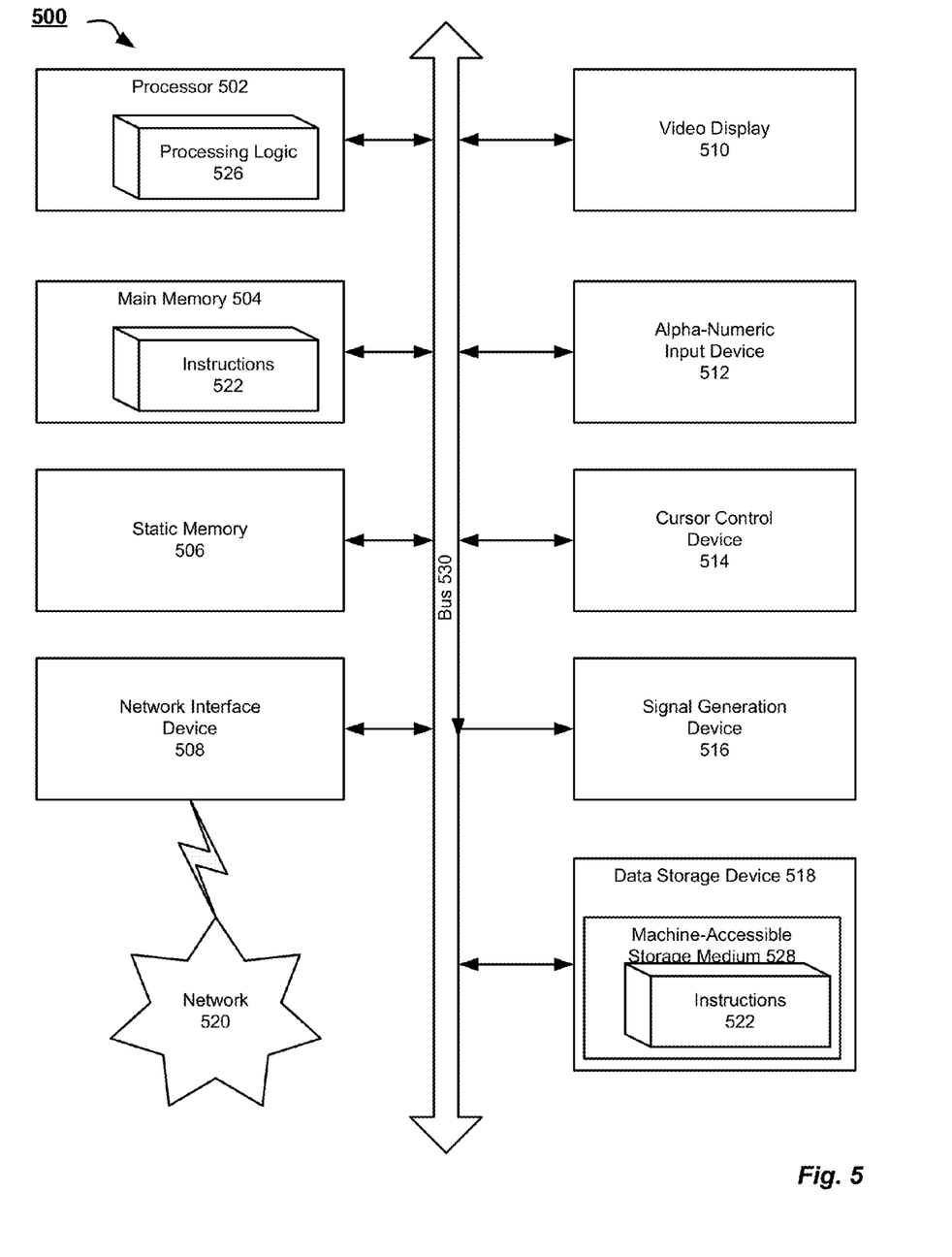
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform virtual machine (VM)-based disk rescue by host machine 110 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 200, 300, and 400 for VM-based disk rescue described with respect to FIGS. 2, 3, and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    starting, by a virtual machine (VM) hosted on a host computing machine, a reboot process of the VM subsequent to a crash and reboot event at the VM;
    selecting, by the VM, a recovery media for use in the reboot process, wherein the recovery media is located separate from a disk of the VM and facilitates recovery of the disk of the VM;
    invoking, by the VM, the recovery media for use in a recovery process of the disk of the VM, the invoking the recovery media further comprising instructing the host computing machine to run the recovery media after a predetermined threshold of VM crashes has been reached; and
    causing, by the VM, a restart of the VM after the recovery process of the recovery media successfully completes.

2. The method of claim 1, wherein the recovery media comprises an image stored on the host computing machine that, when executed by a hypervisor of the host computing machine that manages the VM, is to:
    access the VM disk;
    determine a problem causing a corruption of the VM disk; and
    recover the VM disk from the problem.

3. The method of claim 2, wherein the recovery media comprises an International Organization for Standardization (ISO) image in the host computing machine that is exposed to the VM as read-only bootable media.

4. The method of claim 1, wherein the invoking the recovery media by the VM comprises instructing a recovery management agent of a hypervisor managing the VM in the host computing machine to execute the recovery media upon a next reboot of the VM.

5. The method of claim 4, wherein the VM instructs the recovery management agent to execute the recovery media after the VM determines that at least one of an error condition, a fault condition, or a corruption of a disk of the VM has occurred.

6. The method of claim 1, wherein the invoking the recovery media by the VM comprises:
   presenting a menu to an end user of the VM upon each boot of the VM, wherein the menu comprises an option to run the recovery media; and
   accessing the recovery media when the end user selects the option to run the recovery media from the menu.

7. The method of claim 1, wherein the reboot process of the VM is caused by at least one of an error condition, a fault condition, or a corruption of a disk of the VM.

8. A system, comprising:
   a processing device;
   a memory communicably coupled to the processing device; and
   a virtual machine (VM) executable from the memory to share use of the processing device with one or more other VMs, the VM to:
      start a reboot process of the VM subsequent to a crash and reboot event at the VM;
      select a recovery media for use in the reboot process, wherein the recovery media is located separate from a disk of the VM and facilitates recovery of the disk of the VM;
      invoke the recovery media for use in a recovery process of the disk of the VM, the invoking the recovery media further comprising the VM to cause the recovery media to be run outside of the VM after a predetermined threshold of VM crashes has been reached; and
      cause a restart of the VM after the recovery process of the recovery media successfully completes.

9. The system of claim 8, wherein the recovery media comprises an image stored on the host computing machine that, when executed by a hypervisor of the host computing machine that manages the VM, is to:
   access the VM disk;
   determine a problem causing a corruption of the VM disk; and
   recover the VM disk from the problem.

10. The system of claim 9, wherein the recovery media comprises an International Organization for Standardization (ISO) image in the host computing machine that is exposed to the VM as read-only bootable media.

11. The system of claim 8, wherein the VM to invoke the recovery media further comprises the VM to instruct a recovery management agent of a hypervisor managing the VM to run the recovery media upon a next reboot of the VM.

12. The system of claim 11, wherein the VM further to instruct the recovery management agent to execute the recovery media after the VM determines that at least one of an error condition, a fault condition, or a corruption of a disk of the VM has occurred.

13. The system of claim 8, wherein the VM to invoke the recovery media further comprises the VM to:
   present a menu to an end user of the VM upon each boot of the VM, wherein the menu comprises an option to run the recovery media; and
   access the recovery media when the end user selects the option to run the recovery media from the menu.

14. The system of claim 8, wherein the reboot process of the VM is caused by at least one of an error condition, a fault condition, or a corruption of a disk of the VM.

15. A non-transitory machine-readable storage medium including instructions that, when accessed by a processing device, cause the processing device to perform operations comprising:
   starting, by the processing device subsequent to a crash and reboot event at the VM, a reboot process of a virtual machine (VM) hosted on a host computing machine comprising the processing device;
   selecting, by the VM, a recovery media for use in the reboot process, wherein the recovery media is located separate from a disk of the VM and facilitates recovery of the disk of the VM;
   invoking, by the VM, the recovery media for use in a recovery process of the disk of the VM, the invoking the recovery media further comprising instructing the host computing machine to run the recovery media after a predetermined threshold of VM crashes has been reached; and
   causing, by the VM, a restart of the VM after the recovery process of the recovery media successfully completes.

16. The non-transitory machine-readable storage medium of claim 15, wherein the recovery media comprises an image stored on the host computing machine that, when executed by a hypervisor of the host computing machine that manages the VM, is to:
   access the VM disk;
   determine a problem causing a corruption of the VM disk; and
   recover the VM disk from the problem.

17. The non-transitory machine-readable storage medium of claim 16, wherein the recovery media comprises an International Organization for Standardization (ISO) image in the host computing machine that is exposed to the VM as read-only bootable media.

18. The non-transitory machine-readable storage medium of claim 15, wherein the invoking the recovery media by the VM comprises instructing a recovery management agent of a hypervisor managing the VM in the host computing machine to run the recovery media upon a next reboot of the VM.

19. The non-transitory machine-readable storage medium of claim 18, wherein the VM instructs the recovery management agent to execute the recovery media after the VM determines that at least one of an error condition, a fault condition, or a corruption of a disk of the VM has occurred.

20. The non-transitory machine-readable storage medium of claim 15, wherein the invoking the recovery media by the VM comprises:
   presenting a menu to an end user of the VM upon each boot of the VM, wherein the menu comprises an option to run the recovery media; and
   accessing the recovery media when the end user selects the option to run the recovery media from the menu.

* * * * *